(12) United States Patent
Liu et al.

(10) Patent No.: US 9,784,357 B2
(45) Date of Patent: Oct. 10, 2017

(54) OVERRUNNING ALTERNATOR DAMPING PULLEY

(71) Applicant: Zhejiang Yangtong Automobile Parts Co., Ltd., Ningbo (CN)

(72) Inventors: Zenggang Liu, Ningbo (CN); Shiyong Wang, Ningbo (CN)

(73) Assignee: Ningbo Yangtong Automobile Parts Co., Ltd. (CN)

( * ) Notice: Subject to any disclaimer, the term of this patent is extended or adjusted under 35 U.S.C. 154(b) by 0 days.

(21) Appl. No.: 14/789,753

(22) Filed: Jul. 1, 2015

(65) Prior Publication Data
US 2016/0312875 A1 Oct. 27, 2016

(30) Foreign Application Priority Data

Apr. 27, 2015 (CN) .......................... 2015 1 0205369
Apr. 27, 2015 (CN) ..................... 2015 2 0261869 U

(51) Int. Cl.
| | | |
|---|---|---|
| F16H 9/00 | (2006.01) | |
| F16H 59/00 | (2006.01) | |
| F16H 61/00 | (2006.01) | |
| F16H 63/00 | (2006.01) | |
| F16D 3/00 | (2006.01) | |
| F16H 55/14 | (2006.01) | |
| F16H 55/36 | (2006.01) | |
| F16F 15/121 | (2006.01) | |
| F16D 41/02 | (2006.01) | |

(52) U.S. Cl.
CPC .............. *F16H 55/36* (2013.01); *F16D 41/02* (2013.01); *F16F 15/1216* (2013.01); *F16H 2055/366* (2013.01)

(58) Field of Classification Search
CPC ........ F16D 41/206; F16D 7/022; F16H 55/36; F16H 2055/366; E05Y 2201/49
USPC ..................................................... 474/94, 70
See application file for complete search history.

(56) References Cited

U.S. PATENT DOCUMENTS

| | | | | |
|---|---|---|---|---|
| 2,885,896 A | * | 5/1959 | Hungerford, Jr. ........ | F16H 9/04 192/12 BA |
| 2,959,986 A | * | 11/1960 | Irgens ...................... | F16D 7/02 188/82.6 |
| 3,153,352 A | * | 10/1964 | Sajovec, Jr. .......... | F16D 41/206 192/105 BA |
| 3,618,730 A | * | 11/1971 | Mould, III ............ | F16D 43/211 192/56.2 |
| 4,364,286 A | * | 12/1982 | Ciolli ..................... | B25F 5/001 188/134 |

(Continued)

*Primary Examiner* — Henry Liu
(74) *Attorney, Agent, or Firm* — Wood, Phillips, Katz, Clark & Mortimer

(57) ABSTRACT

The present patent application discloses an overrunning alternator damping pulley. The overrunning alternator damping pulley includes a pulley body, two ball bearings provided on both ends of a shaft hole of the pulley body; and a hub for supporting the two ball bearings. At least one spring holder is provided on the hub. At least one friction spring is installed on the spring holder. One end of the friction spring is inserted to the spring holder. Another end of the friction spring forms a free end spirally extending along an axial direction of the hub. The outer ring of the friction spring is in contact with an inner wall of the pulley body. A damping groove corresponding to the friction spring is provided on the inner wall of the pulley body.

15 Claims, 4 Drawing Sheets

(56) References Cited

U.S. PATENT DOCUMENTS

| | | | | |
|---|---|---|---|---|
| 4,610,339 A * | 9/1986 | Ciolli | | B25B 23/141 192/150 |
| 4,913,274 A * | 4/1990 | Nishimura | | F16D 67/06 192/41 S |
| RE33,514 E * | 1/1991 | Ciolli | | B25B 23/14 192/150 |
| 5,598,913 A * | 2/1997 | Monahan | | F16D 41/206 192/41 S |
| 5,749,449 A * | 5/1998 | Kearney | | F16D 41/206 192/41 S |
| 6,280,332 B1 * | 8/2001 | Knutson | | F16D 41/206 464/59 |
| 6,394,247 B1 * | 5/2002 | Monahan | | F16D 41/206 192/41 S |
| 6,394,248 B1 * | 5/2002 | Monahan | | F16D 41/206 192/41 S |
| 6,637,570 B2 * | 10/2003 | Miller | | F16D 41/206 192/41 S |
| 6,761,656 B2 * | 7/2004 | King | | F16D 41/206 474/74 |
| 6,923,303 B2 * | 8/2005 | Liston | | F16D 41/06 192/113.32 |
| 7,052,420 B2 * | 5/2006 | King | | F16H 55/36 474/74 |
| 7,070,033 B2 * | 7/2006 | Jansen | | F16D 41/20 192/110 R |
| 7,445,206 B2 * | 11/2008 | Lee | | B65H 3/06 271/117 |
| 7,591,357 B2 * | 9/2009 | Antchak | | F16D 41/206 192/41 S |
| 7,878,315 B2 * | 2/2011 | Saito | | F16D 41/206 192/107 T |
| 8,177,669 B2 * | 5/2012 | Ishida | | F16D 41/206 474/166 |
| 8,813,928 B2 * | 8/2014 | Schneider | | F16D 7/022 192/41 S |
| RE45,156 E * | 9/2014 | Jansen | | F16D 3/52 464/60 |
| 8,888,619 B2 * | 11/2014 | Antchak | | F16D 7/022 474/74 |
| 8,951,153 B2 * | 2/2015 | Ishida | | F16D 43/18 474/74 |
| 9,476,497 B2 * | 10/2016 | Liu | | F02B 67/06 |
| 2003/0224886 A1 * | 12/2003 | King | | F16D 41/206 474/70 |
| 2004/0092346 A1 * | 5/2004 | King | | F16H 55/36 474/70 |
| 2005/0250607 A1 * | 11/2005 | Jansen | | F02B 67/06 474/74 |
| 2006/0144664 A1 * | 7/2006 | Antchak | | F16D 41/206 192/41 S |
| 2007/0240964 A1 * | 10/2007 | Saito | | F16D 41/206 192/41 S |
| 2008/0108442 A1 * | 5/2008 | Jansen | | F16D 3/52 464/54 |
| 2008/0194339 A1 * | 8/2008 | Antchak | | F16D 7/022 464/40 |
| 2009/0176608 A1 * | 7/2009 | Jansen | | F02B 67/06 474/74 |
| 2011/0088993 A1 * | 4/2011 | Saito | | F16D 41/206 192/41 S |
| 2013/0092501 A1 * | 4/2013 | Schneider | | F16D 7/022 192/41 S |
| 2013/0150191 A1 * | 6/2013 | Ishida | | F16D 7/028 474/94 |
| 2013/0217524 A1 * | 8/2013 | Antchak | | F02B 67/06 474/94 |
| 2014/0076683 A1 * | 3/2014 | Williams | | B60K 25/02 192/41 S |
| 2014/0141892 A1 * | 5/2014 | Williams | | F16D 41/206 464/40 |
| 2015/0276039 A1 * | 10/2015 | Williams | | F16D 41/206 474/94 |

\* cited by examiner

OVERRUNNING ALTERNATOR DAMPING PULLEY

TECHNICAL FIELD

The present patent application relates to a belt pulley, and specifically, to an overrunning alternator damping pulley for automotive alternators.

BACKGROUND

The running speed of the traditional automotive alternator pulley is synchronized with the car engine. If the speed of the engine changes, the speed of the alternator changes accordingly. The output torque and speed of an internal combustion engine are acyclic due to the explosion of the cylinders. Especillay, when the engine is suddenly accelerated or decelerated, the speed of the alternator pulley changes. However, due to the alternator effect inertia rotor, the rotor speed of the alternator is synchronized with the speed of the engine suddenly. The impact will be formed between the belt and the pulley, reducing belt life and producing noise, resulting an engine Front End Accessory Drive (FEAD). Especially, before the engine is stopped, the engine crankshaft has a short positive and negative direction swing. The excitation coil in the rotor causes damage and reduces the life of the alternator by centrifugal force.

To improve the life of the engine and FEAD, an improvement is made on the structure of the pulley. Such as, Chinese patent application No. CN200920294667 discloses a Overrunning Alternator Pulley (OAP). The OAP includes a pulley wheel, a pulley shaft, an upper ball bearing and lower ball bearing located between the pulley wheel and the pulley shaft, and a overrunning clutch that is arranged between the upper ball bearing and the lower ball bearing. However, the structure of the above overrunning pulley is complicated. It has only overrunning function but no damping function.

SUMMARY

The present patent application intends to overcome the above deficiencies and provide an overrunning alternator damping pulley with a simple structure.

To solve the above technical problem, the present patent application provides an overrunning alternator damping pulley. The overrunning alternator damping pulley includes a pulley body, two ball bearings provided on both ends of a shaft hole of the pulley body; and a hub for supporting the two ball bearings. At least one spring holder is provided on the hub. At least one friction spring is installed on the spring holder. One end of the friction spring is inserted to the spring holder. Another end of the friction spring forms a free end spirally extending along an axial direction of the hub. The outer ring of the friction spring is in contact with an inner wall of the pulley body. A damping groove corresponding to the friction spring is provided on the inner wall of the pulley body.

The damping groove is in an annular shape. The damping groove has a variable width according to the damping requirement.

The damping groove is provided near an end portion of the spring holder.

The spring holder has an arc groove. One end of the friction spring which connects to the spring holder is clamped in the arc groove.

Two sides of the spring holder are inserted to two friction spring respectively. The two friction springs are concentrically set at the two sides of the spring holder with same rotation direction.

The spring holder has two arc grooves and a number of the friction spring is two. Two friction springs are opposite disposed in two sides of the spring holder correspondingly.

Two locking blocks are set on an opposite sides of the hub respectively; two locking grooves corresponding to the two locking blocks are set in the spring holder, the locking blocks are locked in the locking grooves.

The locking blocks are located in the middle of the hub.

The spring holder and the hub can be separately disposed or integrated.

Compared with the prior art, the overrunning alternator damping pulley of the present patent application has an extremely simple structure. By expansion and shrink of the outer ring the friction spring, it can be engaged and disengaged with the pulley body. Thus, it plays a better damping effect. When the rotation speed of the pulley body is higher than that of the hub, the outer ring of the friction spring expands and engages with the pulley body. The hub and the pulley body are combined, so that the hub and the pulley body rotate synchronously and transmit a driving force power. When the rotation speed of the pulley body is lower than that of the hub, the outer ring of the friction spring shrinks. It slips in the inner wall of the pulley body. The hub and the pulley body are disengaged. The hub and the pulley body each rotates, playing a protection and damping effect. In addition, a damping groove is provided on the place where the inner wall and friction spring contacts. The damping groove further provides a damping space for the friction spring, so that it plays a further damping effect at the moment of engaging. Thus, the present patent application provides an overrunning alternator damping pulley with both overrunning and damping functions.

BRIEF DESCRIPTION OF DRAWINGS

FIG. 2 illustrates the assembly of the hub, the spring holder and friction spring. FIG. 3 illustrates the assembly of the part 4 integrating hub and the spring holder with the friction spring.

Figure 1:
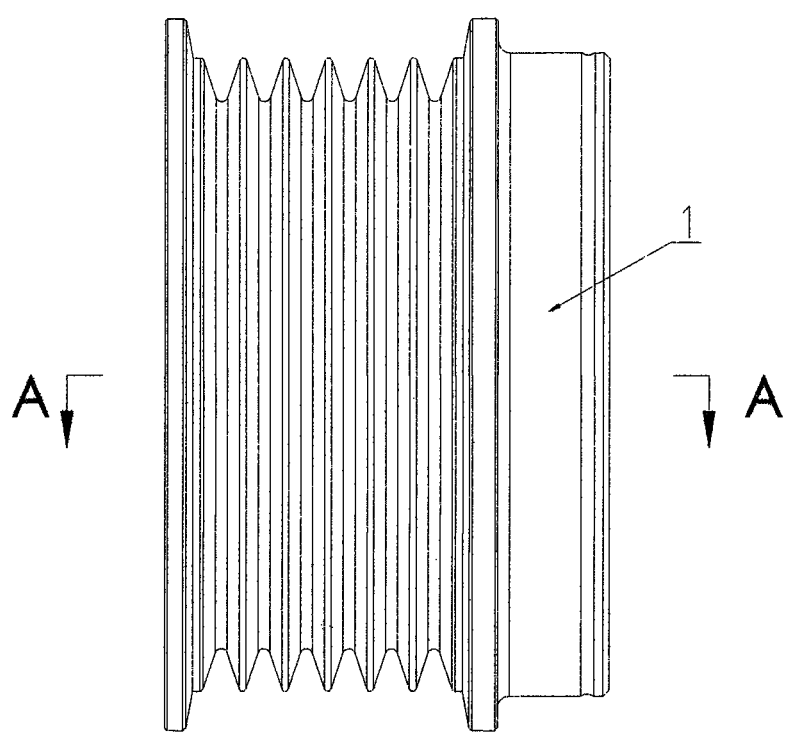
FIG. 1 is a schematic structural diagram of the overrunning alternator damping pulley according to an embodiment of the present patent application.

In the drawings, 1: pulley body; 2: ball bearing; 3: hub; 31: locking block; 4: spring holder; 41: lock groove; 5: friction spring; 6: damping groove; 7: arc groove.

The embodiments depicted in the figures are only exemplary. One skilled in the art will readily recognize from the following discussion that alternative embodiments of the structures and methods illustrated herein can be employed without departing from the principles described herein.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Figure 2:
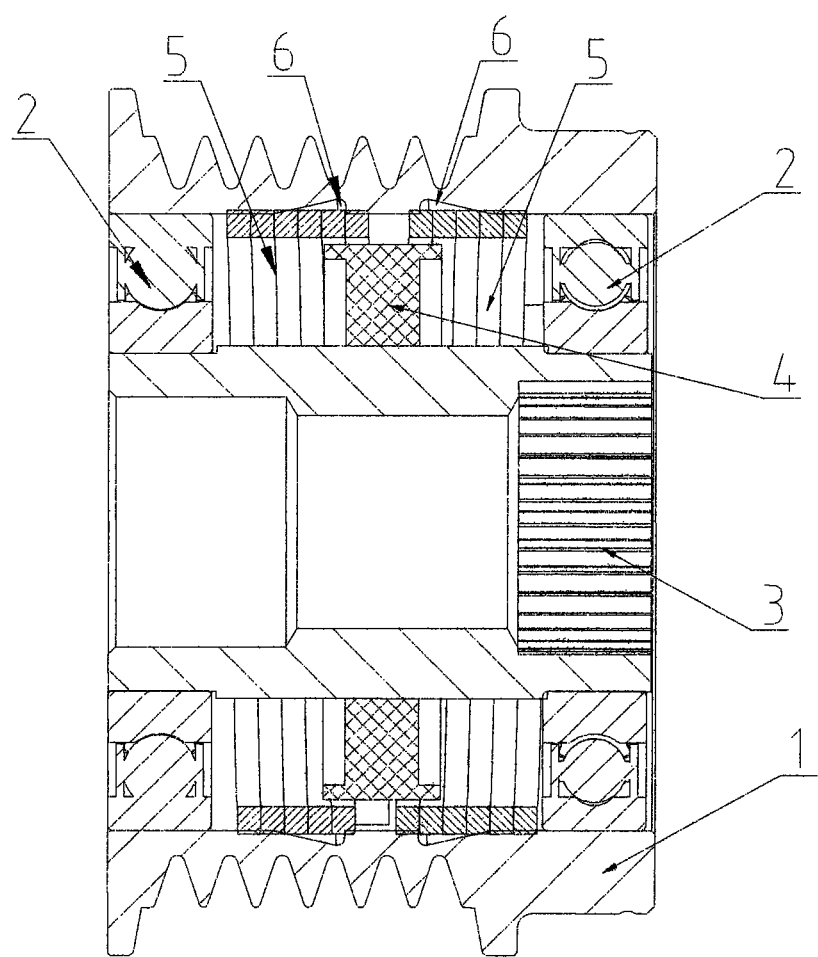
FIG. 2 and FIG. 3 are sectional views taken along A-A of FIG. 1.

Referring to FIG. 1 and FIG. 2, an overrunning alternator damping pulley includes a pulley body 1, two ball bearings 2 and a hub. The two ball bearings 2 are provided on both ends of a shaft hole of the pulley body 1. The hub 3 is used to support the two ball bearings 2. The ball bearings 2 and the pulley body 1 interference fit. At least one spring holder 4 is provided on the hub 3. At least one friction spring 5 is installed on the spring holder 4. One end of the friction spring 5 is connected to the spring holder 4. Another end of the friction spring 5 forms a free end spirally extending along the axial direction of the hub 3. The outer ring of the friction spring 5 is in contact with the inner wall of the pulley body 1.

Thus, by expansion and shrink of the outer ring the friction spring 5, it can be engaged and disengaged with the pulley body 1. It plays a good role in the overrunning clutch. Specifically, when the rotation speed of the pulley body 1 is higher than that of the hub 3, the outer ring of the friction spring 5 expands and engages with the pulley body 1. The hub 3 and the pulley body 1 are combined, so that the hub 3 and the pulley body 1 rotate synchronously and transmit a driving force power. When the rotation speed of the pulley body 1 is lower than that of the hub 3, the outer ring of the friction spring 5 shrinks. It slips in the shaft hole of the pulley body 1. The hub 3 and the pulley body 1 are disengaged. The hub 3 and the pulley body 1 each rotates, playing a protection and damping effect.

In one embodiment, a damping groove 6 is provided on the place where the inner wall and friction spring 5 contacts. The damping groove 6 further provides a damping space for the friction spring 5, so that it plays a further damping effect at the moment of engaging.

In the present embodiment, the damping groove 6 is in an annular shape. It has a variable width according to the damping requirement. The damping groove 6 is set at the place near the end portion of the spring holder 4. In the present patent application, one or more friction spring 5 can be set as needed. For more than one friction spring 5, they can be mounted back to back (they are respectively mounted on both sides of the spring holder 4), or they can be mounted parallel to parallel (one friction spring 5 is mounted on one spring holder 4).

Figure 3:
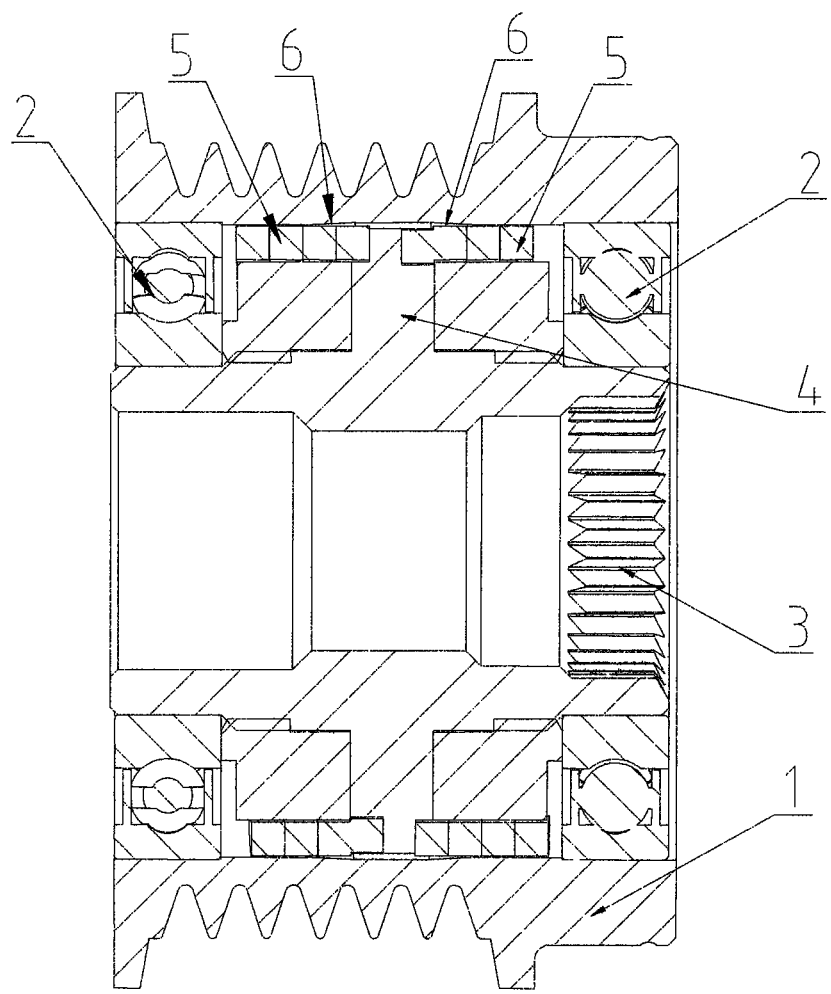

Referring to FIG. 3, the spring holder 4 and the hub 3 are integrated.

Figure 4:
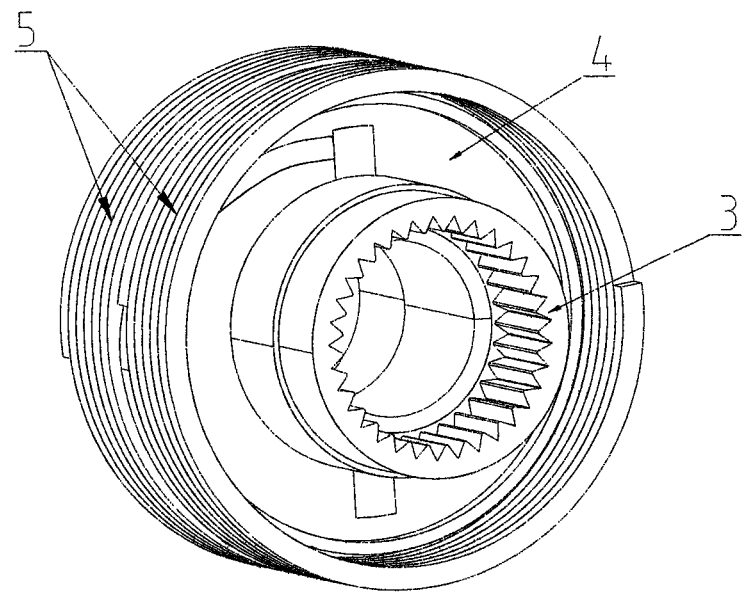
FIG. 4 illustrates the assembly of the hub and the spring holder.
Figure 5:
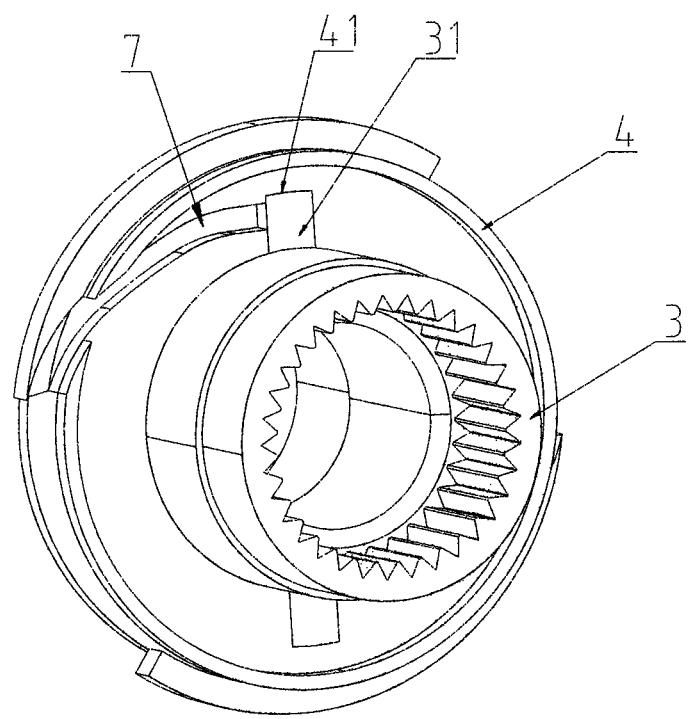
FIG. 5 also illustrates the assembly of the hub and the spring holder.

Referring to FIGS. 4 and 5, in the present embodiment, both sides of the spring holder 4 are inserted to two friction springs 5 respectively. The two friction springs 5 are concentrically set at the two sides of the spring holder 4 with an opposite rotation direction. In particular, both sides of the spring holder 4 are set with an arc groove 7. One end of each friction spring 5 which connects to the spring holder 4 is clamped in the arc groove 7.

Optional, the number of the spring holder 4 is two and the number of the friction spring 5 is two. Two friction springs 5 are opposite disposed in the corresponding spring holder 4.

In this embodiment, two locking blocks 31 are set on the opposite sides of the hub 3 respectively. Two locking grooves 41 corresponding to the two locking blocks 31 are set in the spring holder 4. The locking blocks 31 are locked in the locking grooves 41. The locking blocks 31 are located in the middle of the hub 3. It makes the two friction springs 5 locate at the middle of the hub 3, in order to play the damping role.

As described above, the present patent application discloses an overrunning alternator damping pulley. It has an extremely simple structure. By expansion and shrink of the outer ring the friction spring, it can be engaged and disengaged with the pulley body. Thus, it plays a better damping effect. When the rotation speed of the pulley body is higher than that of the hub, the outer ring of the friction spring expands and engages with the pulley body. The hub and the pulley body are combined, so that the hub and the pulley body rotate synchronously and transmit a driving force power. When the rotation speed of the pulley body is lower than that of the hub, the outer ring of the friction spring shrinks. It slips in the shaft hole of the pulley body. The hub and the pulley body are disengaged. The hub and the pulley body each rotates, playing a protection and damping effect. In addition, a damping groove is provided on the place where the inner wall and friction spring contacts. The damping groove further provides a damping space for the friction spring, so that it plays a further damping effect at the moment of engaging. Thus, the present patent application provides an overrunning alternator damping pulley with both overrunning and damping functions.

Various exemplary embodiments are described herein. Reference is made to these examples in a non-limiting sense. They are provided to illustrate more broadly applicable aspects of the disclosed technology. Various changes can be made and equivalents can be substituted without departing from the true spirit and scope of the various embodiments. In addition, many modifications can be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which can be readily separated from or combined with the features of any of the other several embodiments without departing from the scope or spirit of the various embodiments.

What is claimed is:

1. An overrunning alternator damping pulley comprising:
a pulley body;
two ball bearings provided on both ends of a shaft hole of the pulley body; and
a hub for supporting the two ball bearings;
wherein at least one spring holder is provided on the hub, at least one friction spring is installed on the spring holder; one end of the friction spring is inserted into the spring holder; another end of the friction spring forms a free end spirally extending along an axial direction of the hub; the outer ring of the friction spring is in contact with an inner wall of the pulley body;
wherein a damping groove corresponding to the friction spring is provided on the inner wall of the pulley body;
wherein the damping groove is in an annular shape, the damping groove has a variable width according to a bumping requirement;
the damping groove is provided near an end portion of the spring holder;
wherein the spring holder has an arc groove, one end of the friction spring which inserts to the spring holder is clamped in the arc groove;

wherein two sides of the spring holder are inserted to two friction spring respectively, the two friction springs are concentrically set at the two sides of the spring holder with an opposite rotation direction; wherein the spring holder has two arc groove, and the friction spring has two arc grooves, two friction springs are opposite disposed in the spring holder correspondingly; and wherein two locking blocks are set on an opposite sides of the hub respectively; two locking grooves corresponding to the two locking blocks are set in the spring holder, the locking blocks are locked in the locking grooves;

wherein the locking blocks are located in a middle of the hub.

2. An overrunning alternator damping pulley comprising:
a pulley body;
two ball bearings provided on both ends of a shaft hole of the pulley body; and
a hub for supporting the two ball bearings;
wherein at least one spring holder is provided on the hub, at least one friction spring is installed on the spring holder; one end of the friction spring is inserted to the spring holder; another end of the friction spring forms a free end spirally extending along an axial direction of the hub; the outer ring of the friction spring is in contact with an inner wall of the pulley body; and
wherein a damping groove corresponding to the friction spring is provided on the inner wall of the pulley body;
wherein the damping groove is in an annular shape, the damping groove has a variable width according to a damping requirement; and
wherein the spring holder has an arc groove, one end of the friction spring which connects to the spring holder is clamped in the arc groove;
wherein two sides of the spring holder are inserted to two friction spring respectively, the two friction springs are concentrically set at the two sides of the spring holder with an opposite rotation direction.

3. The overrunning alternator damping pulley of claim 2, wherein a number of the spring holder is two and a number of the friction spring is two, two friction springs are opposite disposed in the spring holder correspondingly.

4. The overrunning alternator damping pulley of claim 2, wherein two locking blocks are set on an opposite sides of the hub respectively; two locking grooves corresponding to the two locking blocks are set in the spring holder, the locking blocks are locked in the locking grooves.

5. The overrunning alternator damping pulley of claim 4, wherein the locking blocks are located in a middle of the hub.

6. The overrunning alternator damping pulley of claim 2, wherein the damping groove is provided near an end portion of the spring holder.

7. The overrunning alternator damping pulley of claim 2, wherein the spring holder and the hub are integrated.

8. An overrunning alternator damping pulley comprising:
a pulley body;
two ball bearings provided on both ends of a shaft hole of the pulley body; and
a hub for supporting the two ball bearings;
wherein at least one spring holder is provided on the hub, at least one friction spring is installed on the spring holder; one end of the friction spring is inserted to the spring holder; another end of the friction spring forms a free end spirally extending along an axial direction of the hub; the outer ring of the friction spring is in contact with an inner wall of the pulley body; and
wherein a damping groove corresponding to the friction spring is provided on the inner wall of the pulley body, wherein two sides of the spring holder are inserted to two friction spring respectively, the two friction springs are concentrically set at the two sides of the spring holder with an opposite rotation direction.

9. The overrunning alternator damping pulley of claim 8, wherein the damping groove is in an annular shape, the damping groove has a variable width according to a damping requirement.

10. The overrunning alternator damping pulley of claim 9, wherein the damping groove is provided near an end portion of the spring holder.

11. The overrunning alternator damping pulley of claim 8, wherein the spring holder has an arc groove, one end of the friction spring which connects to the spring holder is clamped in the arc groove.

12. The overrunning alternator damping pulley of claim 8, wherein the spring holder and the hub are integrated.

13. An overrunning alternator damping pulley comprising:
a pulley body;
two ball bearings provided on both ends of a shaft hole of the pulley body; and
a hub for supporting the two ball bearings;
wherein at least one spring holder is provided on the hub, at least one friction spring is installed on the spring holder; one end of the friction spring is inserted to the spring holder; another end of the friction spring forms a free end spirally extending along an axial direction of the hub; the outer ring of the friction spring is in contact with an inner wall of the pulley body; and
wherein a damping groove corresponding to the friction spring is provided on the inner wall of the pulley body, wherein a number of the spring holder is two and a number of the friction spring is two, two friction springs are opposite disposed in the spring holder correspondingly.

14. An overrunning alternator damping pulley comprising:
a pulley body;
two ball bearings provided on both ends of a shaft hole of the pulley body; and
a hub for supporting the two ball bearings;
wherein at least one spring holder is provided on the hub, at least one friction spring is installed on the spring holder; one end of the friction spring is inserted to the spring holder; another end of the friction spring forms a free end spirally extending along an axial direction of the hub; the outer ring of the friction spring is in contact with an inner wall of the pulley body; and
wherein a damping groove corresponding to the friction spring is provided on the inner wall of the pulley body, wherein two locking blocks are set on an opposite sides of the hub respectively; two locking grooves corresponding to the two locking blocks are set in the spring holder, the locking blocks are locked in the locking grooves.

15. The overrunning alternator damping pulley of claim 14, wherein the locking blocks are located in a middle of the hub.

* * * * *